Patented Feb. 12, 1935

1,991,338

UNITED STATES PATENT OFFICE 1,991,338

LIME MORTAR AND PLASTER

Leroy C. Stewart, Midland, Mich., assignor to The Dow Chemical Company, Midland, Mich., a corporation of Michigan No Drawing. Application March 16, 1931, Serial No. 523,193

8 Claims. (Cl. 106—24)

The subject matter of the present invention is concerned with lime mortars and plasters, especially with a method of improving the strength, durability and other properties of such materials, as well as with the improved product prepared thereby.

Materials of the above type, when prepared and applied in the usual manner, are often deficient in strength and therefore break or crack when subjected to even small stresses, thus much weakening the joints or walls, etc. on which employed and necessitating costly and troublesome repairs. To improve these materials, it has been proposed to mix Portland cement therewith, but the large amount required, however, has made such use of little advantage. For instance, as much as 25 per cent of cement in proportion to the weight of lime is required to give even a noticeable increase of strength in a rich lime mortar; and in a lean mortar, e. g. one containing lime hydrate and sand in the proportion by volume of about 1 to 3, sometimes as much as 50 per cent of cement to the weight of lime is necessary to effect an appreciable increase in strength. It has been further proposed to mix certain soluble salts, such as magnesium chloride or magnesium sulphate, in varying percentages, e. g. from 2 to 20 per cent or more, with such lime mortars, and distinctly beneficial effects are said to have resulted therefrom, particularly in increase in strength, durability, and workability.

I have now found that still further beneficial results may be obtained in such soluble salt-lime mortar and plaster mixtures containing magnesium chloride by intimately mixing therewith a small amount of a compound included within the group consisting of citric, phosphoric and tartaric acids and the alkali-metal and ammonium salts of such acids. To the accomplishment of the foregoing and related ends, the invention, then consists of the features hereinafter fully described and particularly pointed out in the claims, the following description setting forth in detail several preferred combinations of ingredients and modes of carrying out the invention, such disclosed combinations and modes constituting, however, but several of various ways in which the principle of the invention may be used.

In effecting my invention, a lime mortar or plaster containing 1 volume of lime putty, e. g. a lime hydrate made up to such a consistency with water and stirring that a body of the same will substantially maintain a given position without external physical support, and about 3 volumes of sand, is preferably intimately mixed in the usual manner with from 4 to 20 per cent of magnesium chloride ($MgCl_2.6H_2O$) or magnesium sulphate ($MgSO_4.7H_2O$) based on the weight of the hydrated lime, and from $\frac{1}{2}$ to 3 per cent, based on the weight of $MgCl_2.6H_2O$ and/or $MgSO_4.7H_2O$, of a compound or mixture of compounds from the group hereinbefore indicated, consisting of phosphoric, citric, and tartaric acid and the alkali metal and ammonium salts thereof. The above mixture is then mixed with water to a troweling consistency.

To determine the improvement in mortars due to the additive ingredients, mixtures were made up as aforesaid and formed into standard briquets, aged and tested as hereinafter indicated. In the following examples, which are given for the purpose of illustration, the tensile strength values for the various periods of time are shown and expressed in pounds per square inch, and are the average of the values obtained in each instance from three specimens. The limes employed in the following examples were commercial hydrated lime or quick lime made up with water to the consistency of putty, a lime from a different source being used in each example. To 100 pounds of such hydrated lime was added 16 pounds of $MgCl_2.6H_2O$ and the given weight of the benefiting compound. The latter two materials had been finely pulverized together into a substantially homogeneous mixture previous to adding to the putty. With the gradual addition of water to the materials, the same were then stirred to a troweling consistence and made up into briquets. In the following examples the per cent of magnesium chloride, $MgCl_2.6H_2O$, is based upon the weight of hydrated lime used, and the per cent of beneficial substance, e. g. citric acid, disodium phosphate or tartaric acid, is based upon the weight of magnesium chloride.

EXAMPLE I

Hydrated lime containing magnesium chloride ($MgCl_2.6H_4O$) and citric acid

| Test specimen | A | B | C | D | E | F |
|---|---|---|---|---|---|---|
| $MgCl_2.6H_2O$ percent | None | 16 | 16 | 16 | 16 | 16 |
| Citric acid percent | None | None | 0.5 | 1 | 2 | 3 |
| Initial set (hr.; min.) | | 7:15 | | 6:45 | | 5:15 |
| Final set (hr.; min.) | | 13:30 | | 13:15 | | 12:00 |
| 7-day tensile strength | 8 | 20 | 20 | 21 | 22 | 18 |
| 30-day tensile strength | 15 | 43 | 53 | 57 | 57 | 43 |
| 90-day tensile strength | 21 | 84 | 85 | 143 | 147 | 126 |

EXAMPLE II

*Hydrated lime containing magnesium chloride ($MgCl_2.6H_2O$) and disodium phosphate*

| Test specimen | A | B | C | D | E | F |
|---|---|---|---|---|---|---|
| $MgCl_2.6H_2O$ percent | None | 16 | 16 | 16 | 16 | 16 |
| Disodium phosphate percent | None | None | 0.5 | 1 | 2 | 3 |
| Initial set (hr.; min.) | | 4:30 | | 5:15 | | 5:45 |
| Final set (hr.; min.) | | 8:45 | | 11:00 | | 11:45 |
| 7-day tensile strength | 15 | 24 | 19 | 32 | 34 | 37 |
| 30-day tensile strength | 14 | 46 | 36 | 46 | 47 | 51 |
| 90-day tensile strength | 15 | 106 | 116 | 124 | 130 | 133 |

EXAMPLE III

*Hydrated lime containing magnesium chloride ($MgCl_2.6H_2O$) and tartaric acid*

| Test specimen | A | B | C | D | E | F |
|---|---|---|---|---|---|---|
| $MgCl_2.6H_2O$ per cent | None | 16 | 16 | 16 | 16 | 16 |
| Tartaric acid per cent | None | None | 0.5 | 1 | 2 | 3 |
| Initial set (hr.; min.) | | 6:00 | | 6:00 | | 6:00 |
| Final set (hr.; min.) | | 18:00 | | 18:00 | | 18:00 |
| 7-day tensile strength | 6 | 14 | 23 | 22 | 26 | 16 |
| 30-day tensile strength | 8 | 50 | 61 | 57 | 62 | 49 |
| 90-day tensile strength | 10 | 102 | 114 | 153 | 144 | 112 |

Although the significance of the data given in the foregoing examples is apparent, yet certain outstanding features of my invention may be noted.

In specimen A of each such example results of tests on lime mortars alone are given, the same showing the rather wide range of strength that might be ordinarily expected in such materials when used for the purpose in question. In like manner in specimen B, such limes are mixed with magnesium chloride ($MgCl_2.6H_2O$) to illustrate the beneficial effect of adding such chloride separately thereto. Still further, the results set forth in specimens C, D, E, and F, respectively, show the additional beneficial effects obtained in such mixture as employed in specimen B, when small amounts of the beneficial compounds are used according to the invention, such beneficial effects being particularly outstanding in the tensile strengths shown for the longer periods of time, for instance, in test specimens D and E of Examples I and III, respectively, and in test specimens E and F, of Example II. The results obtained with different limes may also vary considerably in a given series of tests; however, practically all lime mortars and plasters when treated according to my invention were found to be greatly benefited, in some instances an increased strength of five to seven hundred per cent or more being obtained as compared with the original lime plaster and an additional increased strength of twenty to seventy-five per cent over that of the composition consisting of such lime and the magnesium chloride ($MgCl_2.6H_2O$) and/or magnesium sulphate ($MgSO_4.7H_2O$) alone.

The percentage of magnesium chloride ($MgCl_2.6H_2O$) used is the same in all examples, i. e. 16 per cent, and is thus employed for convenience in the interpretation of the results obtained. However, smaller quantities of the magnesium chloride, as little as 2 per cent even, or larger amounts, as much as 30 per cent or more, have given very satisfactory results.

By the term lime of "lime mortars and plasters", as used in the specification, is meant either calcium hydrate or calcium-magnesium hydrate, such hydrates being obtained by decarbonating limestone, marble, dolomite, etc., in the usual way, and then hydrating the oxides thus formed.

It is also noted that the thin finishing lime mortar coating for walls, for instance, may be likewise benefited by treating according to my invention. In such instance, however, in place of a putty being made up and applied by a trowel, a thick lime hydrate suspension, with or without a sand or other suitable filler, as desired, is preferably provided and an aqueous solution of a given strength of the soluble magnesium salt and the beneficial compound, as previously indicated, intimately mixed therewith and the same applied with a brush or in other suitable manner. The lime coating thus made forms a better bond with the surface upon which it is applied, and, in drying, checks and breaks less and may be applied more easily than that previously used for such purpose.

It is obvious that when acids such as citric and tartaric acid are mixed with lime mortars that the lime salt of the corresponding acid is formed and is the active beneficial principle. In a general way both the acids and salts included within the group of citrates, phosphates, and tartrates are applicable to the invention. The action of the materials forming the basis of my invention is not well known, but it is believed that such beneficial materials exert a dispersing effect on the mixture of lime and magnesium chloride, magnesium sulphate, or the magnesium hydrate formed in the reaction, thus producing an increase in strength, hardness and otherwise benefiting such mortars and plasters. The mortar compositions thus provided are also more plastic and may be worked with greater facility.

In certain instances where a less hygroscopic mortar is desired, I may mix with the lime hydrate a mixture of magnesium chloride and magnesium sulphate. Mixtures of two or more of the active ingredients comprising my invention such as the citrates, phosphates, etc. may be made up beforehand or mixed in the mortar. For facilitating shipping and handling, the magnesium chloride and the citrate, phosphate or tartrate are preferably mixed in dry form, such mixture being suitable for incorporating in the mortar or plaster practically as used commercially. The method of adding the citric acid, disodium phosphate, etc. is a matter of convenience only and may be accomplished in any suitable manner.

In summation, my invention consists in adding certain beneficial substances to lime mortars and plasters containing varying amounts of soluble magnesium salts such a magnesium chloride, for instance, whereby, when such mixtures are admixed with water, they set up to form materials of the type in question which possess increased strength, greater density and durability and are otherwise of superior quality. The invention also includes the improved products made according to the method disclosed.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A method of improving lime mortars and plasters which comprises intimately mixing therewith about 4 to 30 per cent of magnesium chloride, based upon the weight of the lime, and ½ to 3 per cent of citric acid based upon the ½ to 3 per cent of citric acid based upon the weight of magnesium chloride ($MgCl_2.6H_2O$).

2. A new lime mortar and plaster composition comprising a mixture of hydrated lime to which has been added magnesium chloride together with a relatively small amount of citric acid intimately mixed therewith, said composition being adapted to setting up when admixed with water.

3. A new lime mortar and plaster composition comprising hydrated lime to which has been added about 4 to 30 per cent magnesium chloride together with 0.5 to 3 per cent of citric acid based upon the weight of magnesium chloride ($MgCl_2.6H_2O$) and intimately mixed therewith, said composition being adapted to setting up when admixed with water.

4. A lime mortar and plaster composition comprising hydrated lime to which has been added from 4 to 30 per cent of magnesium chloride, $MgCl_2.6H_2O$, together with from 0.5 to 3 per cent, based upon the weight of magnesium chloride, of a compound from the group consisting of phosphoric acid and the alkali-metal and ammonium phosphates, said composition being adapted to set when admixed with water.

5. A method of improving lime mortars and plasters which comprises intimately mixing therewith from 4 to 30 per cent by weight of a soluble magnesium salt, based upon the weight of the lime, and from ½ to 3 per cent by weight, based upon the weight of the magnesium salt, of a compound selected from the group consisting of citric, phosphoric and tartaric acids and the alkali-metal and ammonium salts of such acids.

6. A method of improving lime mortars and plasters which comprises intimately mixing therewith from 4 to 30 per cent by weight of magnesium chloride, $MgCl_2.6H_2O$, based upon the weight of the lime, and from ½ to 3 per cent by weight, based upon the weight of the magnesium chloride, of a compound selected from the group consisting of citric, phosphoric and tartaric acids and the alkali-metal and ammonium salts of such acids.

7. A lime mortar and plaster composition comprising hydrated lime to which has been added from 4 to 30 per cent of its weight of a soluble magnesium salt, and from ½ to 3 per cent by weight, based upon the weight of the magnesium salt, of a compound selected from the group consisting of citric, phosphoric and tartaric acids and the alkali-metal and ammonium salts of such acids.

8. A lime mortar and plaster composition comprising hydrated lime to which has been added from 4 to 30 per cent of its weight of magnesium chloride, $MgCl_2.6H_2O$, and from ½ to 3 per cent by weight, based upon the weight of the magnesium chloride, of a compound selected from the group consisting of citric, phosphoric and tartaric acids and the alkali-metal and ammonium salts of such acids.

LEROY C. STEWART